United States Patent [19]

Donnelly et al.

[11] 4,043,996
[45] Aug. 23, 1977

[54] GELATIN MANUFACTURE-PEROXIDE LIQUEFACTION PROCESS

[75] Inventors: Thomas H. Donnelly, Western Springs, Ill.; Robert S. McGinnis, Florissant, Mo.

[73] Assignee: Swift & Company, Chicago, Ill.

[21] Appl. No.: 544,415

[22] Filed: Jan. 27, 1975

[51] Int. Cl.² ............................................. C09H 3/00
[52] U.S. Cl. ...................................................... 260/118
[58] Field of Search ................................ 260/117, 118

[56] References Cited

U.S. PATENT DOCUMENTS

| | | | |
|---|---|---|---|
| 834,806 | 10/1906 | Hilbert | 260/118 |
| 2,184,494 | 12/1939 | Glass | 260/118 |
| 2,191,206 | 2/1940 | Schwartz | 260/118 |
| 3,308,113 | 3/1967 | Johnsen | 260/118 |

OTHER PUBLICATIONS

Courts, "Structural Changes in Collagen," Biochemical Journal, vol. 81, 1961, pp. 356–365.

*Primary Examiner*—Paul R. Michl
*Attorney, Agent, or Firm*—Edward T. McCabe; Charles E. Bouton

[57] ABSTRACT

Gelatin is extracted from collagen-containing substances by liquefaction with hydrogen peroxide as the sole lyotropic agent. Collagen-bearing tissue is liquefied through agitation with hydrogen peroxide at about 45°–60° C. for from about 4 to about 24 hours at concentrations such that the weight of peroxide is from about 1/3 to 3 times the weight of collagen protein within the system. The thus formed colloidal solution gels upon cooling, and gelatin degradation is minimized by removing peroxide from the solution before the gelatin is dried.

7 Claims, No Drawings

GELATIN MANUFACTURE-PEROXIDE LIQUEFACTION PROCESS

The present invention relates to a process of liquefaction by a hydrogen peroxide solution for extracting gelatin from uncured collagen-bearing tissue.

It is well known that gelatin can be extracted from collagen, a protein occurring in vertabrates as a chief constituent of the fibrils of connective tissue, of the skins and hides, and of the organic substance of the bones. When dissolved in water, collagen forms a colloidal solution which gels upon cooling. It is also well known that lyotropic agents such as urea, calcium nitrate, and sodium naphthalene sulfonate for example depress the melting point of a gelatin gel such that its solution is liquid at room temperature and below.

Certain prior art suggests that hydrogen peroxide might be useful in gelatin extraction techniques. For example: Keil U.S. Pat. No. 2,908,615 discloses the use of a low concentration of hydrogen peroxide as a sterilizing agent for collagen-bearing tissue; Hilbert U.S. Pat. No. 834,806 teaches that hydrogen peroxide can be a bleaching agent in a process of boiling bones for making gelatin; and Courts, "Structural Changes In Collagen", *Biochemistry Journal,* Volume 81, pages 356,265 (1961) indicates that a stable gelatin of measurable Bloom can be prepared by solubilizing collagen when hydrogen peroxide is used in conjunction with a hydrogen-bond breaking reagent (designated as a lyotropic agent herein) such as sodium salicylate. Heretofore, it has not been recognized that hydrogen peroxide is itself a lyotropic agent or that gelatin can be preapred from uncured collagen-containing tissues through solubilization or liquefaction by a hydrogen peroxide solution alone, while minimizing degradation of the gelatin.

It is therefore an object of this invention to provide a process of tissue liquefaction to form gelatin wherein hydrogen peroxide is the sole lyotropic agent.

Another object of the present invention is an improved process for the production of gelatin.

A further object is a process for extracting gelatin from either cured or uncured collagen-bearing tissues, wherein hydrogen peroxide is utilized as the only lyotropic agent to effect liquefaction by the breaking of hydrogen bonds.

Yet another object of this invention is a process by which gelatin is prepared from either cured or uncured collagen liquefied by hydrogen peroxide, but in which degradation of such gelatin is minimized.

The present invention relates to a process of liquefaction, wherein hydrogen peroxide is the only lyotropic agent in gelatin manufacture from collagen-bearing tissues that are liquefied by an aqueous solution of hydrogen peroxide, wherein the weight ratio of hydrogen peroxide to collagen is from about 1:3 to 3:1. Hydrogen peroxide is then removed from the liquefied collagen to minimize degradation of gelatin upon the drying thereof.

Other objects and advantages of the present invention will be apparent to those skilled in the art from the detailed description of the invention which follows.

It has been determined that satisfactory liquefaction is realized when an aqueous solution of hydrogen peroxide is the sole lyotropic agent for breaking hydrogen bonds and thus making possible the solubilization of otherwise water-in-soluble collagen-bearing substances. Hydrogen peroxide is included at concentrations such that the weight ratio of hydrogen peroxide to the collagen content of the particular substance to be solubilized is from about 1 to 3 to about 3 to 1, preferably around 1 to 1.

The process can be utilized, for example, when the collagen-bearing tissue is that of the fibrils of the connective tissue, hides, skins, or organic bone substances of vertabrates. Such tissue is contacted with a hydrogen peroxide solution, wherein the weight content of hydrogen peroxide is from about ⅓ to about 3 times the weight of collagen within the tissue. Suitable concentration ranges for hydrogen peroxide are from about 4 to about 20 percent peroxide. Such "percent peroxide" as used throughout herein is defined as volume peroxide multiplied by 35 and divided by the sum of the volume of peroxide plus water. Suitable ranges for collagen are about 4 to about 12 percent collagen, where "percent collagen" is defined throughout herein in terms of being a portion of "percent tissue", defined as 100 times the weight of tissue divided by the sum of the weight of tissue plus the volume of peroxide and water. At these concentrations, the tissue is dissolved. It is not necessary for the tissues to have been previously cured, for example, in a low pH medium. Indeed, it is an advantageous feature of this invention that liquefaction is accomplished in the present system even if the substance dissolved has not been cured and has had no other form of pretreatment.

The process of this invention is accomplished under moderately elevated temperatures for a period as long as 2 days, if desired. A generally acceptable temperature range is approximately 30° to 70° C. and the time in which liquefaction of a normally water-insoluble substance is accomplished is from about 2 to as long as about 48 hours. During such a process, uncured tissue is placed in a hydrogen peroxide solution, accompanied by moderate agitation. The weight of hydrogen peroxide is about ⅓ to 3 times that of the weight of collagen within the tissue. Under these conditions and these relative concentrations, the collagen dissolves within the aqueous system, forming a colloidal solution during this single step. Upon cooling, such a colloidal solution will gel to form a gelatin of measureable gel strength, or Bloom.

As previously mentioned, acceptable hydrogen peroxide concentrations for this gelatin forming method are from about 4 to about 20 percent peroxide, and acceptable collagen concentrations are from about 4 to about 12 percent collagen. The quantity of the tissue that can be treated will vary somewhat with the type of tissue, the most important variable being the percentage of collagen normally found within a particular type of tissue. For example, the skins of pigs contain roughly 20% by weight collagen, and if one were to include pigskins of about 40% tissue, then the content of collagen would be approximately 8 percent collagen.

The single step liquefaction is accompanied by heating to about 45° to 60° C., preferably about 50° to 55° C., under moderate agitation. It has been determined that the degree of agitation is relatively unimportant in the amount of yield or in the quality of the final gelatin product. The single step is usually satisfactorily accomplished over a period of about 4 to 24 hours, preferably about 7 to 16 hours. These ranges are suitable, economically realistic limits. Significant solubilization still occurs at temperatures as low as 30° C., if the process is carried out over relatively long periods of time and at relatively high percents peroxide. The temperature can range as high as 70° C., above which practically the entire gelatin yield will be degraded. Also, solubilization begins immediately and progresses thereafter such that a low yield can be achieved within an hour or 2 and the process could be continued for longer than 24 hours, although the yield would not thereafter greatly increase.

After accomplishing the single liquefaction step, a peroxide immobilization step is preferred so as to avoid having the hydrogen peroxide degrade the gelatin upon the drying thereof. It is often important to recover the hydrogen peroxide from the colloidal solution so as to increase the economic feasibility of the process. When this objective is to be realized, the peroxide immobilization step is one of peroxide recovery. One such recovery step is of the ultrafiltration type, which may include the type of process known as reverse osmosis which is ultrafiltration with a membrane or filter that is particularly fine. By such ultrafiltration, hydrogen peroxide and water within the colloidal solution diffuse through a finely porous membrane. Usually more than one, often about three, diffusions, which are preceded by washing with water, are needed to reduce the hydrogen peroxide content of the solution to acceptable levels, usually on the order of 0.5 weight percent of the weight of the system.

Should such a peroxide recovering step not be carried out as the peroxide immobilization step, the gelatin formed by the present process will tend to undergo a degradation when same is later dried to place it into a form in which it is usually commercially marketed. Customary commercial preparation of gelatins includes a tunnel drying step well known in the art. It is believed that undesirable gelatin degradation is brought on by the presence of unrecovered hydrogen peroxide within the colloidal solution, which can degrade some of the gelatin during this traditional drying operation. This problem can be controlled by accomplishing the peroxide immobilization step, which can include a peroxide decomposition prior to drying.

One acceptable decomposition step is accomplished by removing an oxygen atom from each hydrogen peroxide molecule through the action of a catalytic enzyme such as catalase. It is believed to be important that such an enzyme be free from contamination by ingredients such as proteolytic enzymes which create side reactions that themselves cause gelatin degradation. When used, catalase is added in catalytic amounts well known to biochemists as being adequate for the concentrations and characteristics of each particular colloidal system. Generally, the catalyst content must be replenished from time to time during peroxide decomposition. Also, it is important not to permit the catalytic decomposition to take place too swiftly in order to avoid the formation of unmanageable quantities of form. Acceptable decomposition times are on the order of one-half an hour.

Another acceptable manner for accomplishing peroxide decomposition is the utilization of a reducing agent such as sodium sulfite to chemically reduce hydrogen peroxide to water while the sodium sulfite is oxidized to sodium sulfate. Such reducing agents are added, usually at ambient temperature and pressure, in stoichiometric amounts in accordance with the chemical reaction:

$$H_2O_2 + Na_2SO_3 \rightarrow H_2O + Na_2SO_4$$

The sulfate thus formed coacervates with the gelatin for subsequent separation.

The following examples are set forth as illustrative of the invention and are not to be taken in any manner as limiting the scope of the invention which is defined by the appended claims.

EXAMPLES I–VII

Approximately 1 inch square pigskin pieces were immersed in hydrogen peroxide solutions of various concentrations and were warmed at different temperatures for varied lengths of time, as reported in the table that follows. In each case, the "percent tissue" as defined herein was about 30. Since pigskins are roughly 1/5 collagen protein, each sample reported in the table contained, as a rough approximation, 6 "percent collagen" as defined herein. Each system was subjected to the same amount of moderate agitation and to a peroxide immobilization step in which hydrogen peroxide was degraded with stoichiometric amounts of sodium sulfite. The percent of yield and the Bloom value obtained for each sample are also reported.

| Ex. | "Percent Peroxide" | Time (Hours) | Temperature (Degrees C) | Yield (% Basis Skins) | Bloom (gms) |
|-----|--------------------|--------------|-------------------------|-----------------------|-------------|
| I   | 18                 | 8            | 45                      | 11                    | 152         |
| II  | 5                  | 8            | 60                      | 18                    | 160         |
| III | 9                  | 8            | 60                      | 18                    | 158         |
| IV  | 9                  | 16           | 45                      | 16                    | 80          |
| V   | 5                  | 12           | 45                      | 5                     | 188         |
| VI  | 9                  | 12           | 60                      | 18                    | 151         |
| VII | 8                  | 8.45         | 53                      | 11                    | 287         |

From this data and other data not listed herein, regression equations were determined as a means for predicting resultant yields and Blooms as the temperature, the time, the percent peroxide and the percent tissue are varied. The equations were determined through a temperature range of 4°–75° C., a time range of 1–48 hours, a percent peroxide range of 0–27, and a percent tissue range of 10–40. These regression equations are:

$$\begin{aligned}
\% \text{ Gelatin in extract (Yield)} &= 5.55\,(0.15382 \\
&\quad + 0.00038 \times \% \text{ Peroxide} \times \text{Temperature} \\
&\quad + 0.00196 \times \% \text{ Tissue} + 0.00040 \times \text{Time} \times \text{Temp.} \\
&\quad + 0.00162 \times \% \text{ Tissue} - 0.00003 \times \text{Time} \\
&\quad + 0.00039 \times \% \text{ Peroxide} \times \text{Time} + 0.00020 \times \text{Temp.}^2 \\
&\quad - 0.01717 \times \text{Temp.} + 0.0008 \times \% \text{ Tissue} \times \text{Temp.} \\
&\quad - 0.00610 \times \% \text{ Peroxide} - 0.01009 \times \text{Time}) \pm 0.0288 \\
\text{Bloom} &= 383.00 + 0.01033 \times \text{Temp.} \times \text{Time} \\
&\quad - 0.12678 \times \text{Temp.}^2 - 0.00054 \times \text{Time}^2 \\
&\quad - 0.82664 \times \% \text{ Peroxide}^2 + 0.25186 \times \% \text{ Peroxide} \times \text{Temp.} \\
&\quad \pm 10.00
\end{aligned}$$

Particularly advantageous gelatin yield and Bloom are calculated and realized when the varible parameters of these equations are within the preferred ranges indicated elsewhere herein; that is, when the temperature range is about 50° to about 55° C., when the time varies between about 7 to about 16 hours, when the "percent peroxide" varies between about 4 to about 20, and when the "percent collagen" varies between about 4 to about 12 (or when the "percent tissue" for pigskin having a 20% collagen content varies between about 20 to about 60).

Obviously, many modifications and variations of the invention as hereinbefore set forth may be made without departing from the spirit and scope thereof, and only such limitations should be imposed as are indicated in the appended claims.

I claim:

1. A gelatin extraction process comprising the steps of: placing an uncured normally water-insoluble collagen-containing tissue in an aqueous hydrogen peroxide solution, said hydrogen peroxide being a sole lyotropic agent to effect liquefaction of said tissue; said liquefaction step being accomplished at a temperature within the approximate range of 45° to about 60° C. for about 7 to about 24 hours, the weight ratio of hydrogen peroxide to collagen within said uncured tissue being from about 1:3 to about 3:1; immobilizing said hydrogen peroxide; and drying the tissue liquefaction to recover gelatin.

2. The process of claim 1, wherein the liquefaction step is accomplished under moderate agitation at a temperature within the approximate range of about 50° to about 55° C.

3. The process of claim 1, wherein the liquefaction step has a duration of about 7 to about 16 hours.

4. The process of claim 1, wherein the liquefaction step is accomplished at a temperature of about 50° to about 55° C. for about 7 to about 16 hours, and the weight ratio of hydrogen peroxide to collagen is on the order of one to one.

5. The process of claim 1, wherein said immobilizing step is accomplished by ultrafiltration of the liquefaction to remove and recover hydrogen peroxide therein.

6. The process of claim 1, wherein said immobilizing step is accomplished by decomposing the hydrogen peroxide with catalytically adequate amounts of a catalytic enzyme.

7. The process of claim 1, wherein said immobilizing step is accomplished by decomposing the hydrogen peroxide with stoichiometric amounts of a chemical reducing agent.

* * * * *